UNITED STATES PATENT OFFICE.

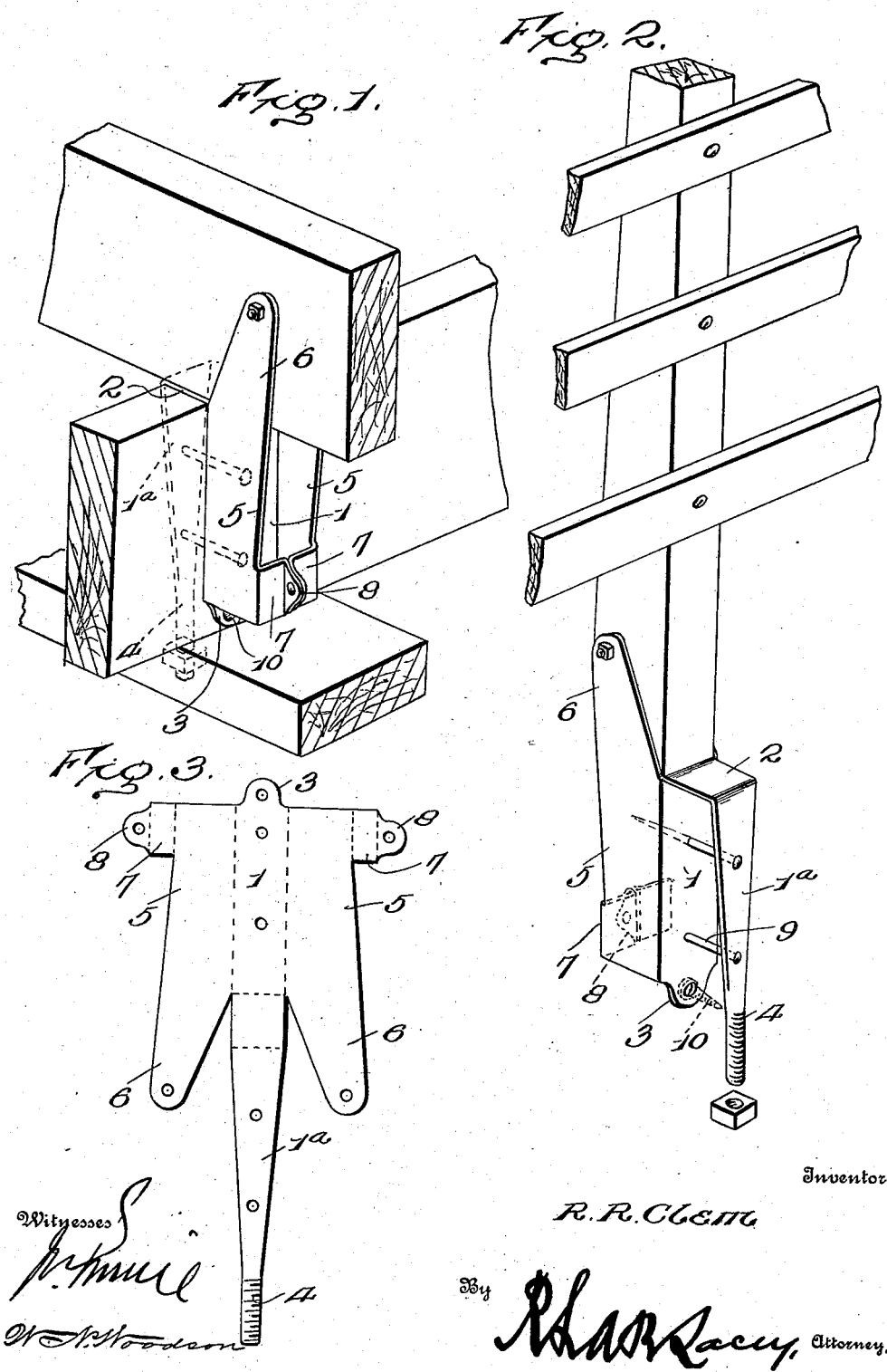

RICHARD R. CLEM, OF AMES, IOWA.

TIMBER-TIE.

No. 911,208.  Specification of Letters Patent.  Patented Feb. 2, 1909.

Application filed April 7, 1908. Serial No. 425,741.

*To all whom it may concern:*

Be it known that I, RICHARD R. CLEM, a citizen of the United States, residing at Ames, in the county of Story and State of Iowa, have invented certain new and useful Improvements in Timber-Ties, of which the following is a specification.

This invention contemplates certain new and useful improvements in timber ties, and the object of the invention is a simple, durable and efficient construction of device of this character which is designed particularly for use in the construction of farm vehicles such as hay racks, wagon boxes or the like, which is arranged to effectually and rigidly secure together two or more beams, and which is also adapted to detachably support the standards of the sides of a rack.

With this and other objects in view that will more fully appear as the description proceeds, the invention consists in certain constructions and arrangements of the parts that I shall hereinafter fully describe and then point out the novel features thereof in the appended claim.

For a full understanding of the invention and the merits thereof, and to acquire a knowledge of the details of construction, reference is to be had to the following description and accompanying drawing, in which:

Figure 1 is a perspective view illustrating one application of my invention; Fig. 2 is a similar view illustrating another application thereof; and, Fig. 3 shows a blank from which the device is formed.

Corresponding and like parts are referred to in the following description and indicated in all the views of the drawing by the same reference characters.

My improved timber tie embodies a saddle that is constructed of two substantially parallel spaced inner and outer plates 1 and 1$^a$, which are rigidly secured together at their upper ends by a cross bar 2, one of said plates 1 being formed at its lower end with a depending segmental lip 3. The other plate 1$^a$ preferably tapers towards its lower end, and terminates in a threaded shank 4 which extends downwardly below the lip of the plate 1. The plate 1 is formed at its lateral edges with perpendicularly and outwardly disposed side members 5 which extend upwardly beyond the upper end of the plate 1 and constitute spaced ears 6. These sides 5 are formed at their outer edges and near their lower ends with perpendicularly and inwardly disposed flanges 7 which are formed at their meeting edges with outstanding portions 8 that are riveted or otherwise suitably fastened together, so as to rigidly secure together the flanges 7 and complete the formation of a timber seat at the lower end of the sides.

In the practical use of my improved timber tie, the latter is mounted upon the bed piece of a hay rack, with the plates 1 and 1$^a$ straddling said bed piece and secured thereto by means of rivets 9 or other suitable fastening means passing therethrough, the device being further secured to the bed piece by a screw 10 passing through the lip 3 of the plate 1, as shown. When the device is in position on the bed piece, the threaded shank 4 is arranged to extend downwardly through the bottom cross beam of the hay rack, and is secured to the latter by a nut mounted upon its extremity. The upper cross beam of the hay rack extends transversely across the bed piece, rests upon the cross bar 2 of the timber tie and fits between the spaced ears 6, a pin or bolt or the like passing through the latter and detachably securing the upper cross beam in position. In another application of the device, the latter is secured to the bed piece and a lower cross beam, as previously described, and a standard of the side of the hay rack is inserted between the side members 5 with its lower end fitting in the seat or pocket at the lower end of the latter, the ears 6 extending on opposite sides of the standard, and a pin or bolt passing therethrough to detachably secure the standard to the device and support it rigidly in position.

While my improved timber tie has been described as applied to a hay rack, it is to be understood that it is susceptible to various other uses which will at once present themselves to farmers and others for whom the device is intended.

It will be seen that my improved device may be cheaply and efficiently constructed from sheet metal, and Fig. 3 illustrates a blank from which the timber tie is formed.

Having thus described the invention, what I claim is:

A timber tie constructed of an integral sheet of metal bent to form spaced inner and outer plates and a cross bar rigidly connecting the same at their upper ends, the outer plate being formed at its lower end with a perforated lip, and the inner plate terminating in a threaded shank extending downwardly beyond the lip, the outer plate being also formed at its side edges with perpendicularly and outwardly disposed side members that project upwardly beyond the cross bar to constitute spaced ears, and that are provided at their outer edges near their lower ends with flanges which are disposed toward each other and are formed at their meeting edges with outstanding portions designed to be rigidly secured together to complete the formation of a timber seat.

In testimony whereof I affix my signature in presence of two witnesses.

RICHARD R. CLEM. [L. S.]

Witnesses:
FRANK J. GRAVES,
OSCAR J. DUNHAM.